(12) United States Patent
Andre et al.

(10) Patent No.: US 7,669,914 B2
(45) Date of Patent: Mar. 2, 2010

(54) MOTOR VEHICLE REAR DOOR

(75) Inventors: Gerald Andre, Amberieu en Bugey (FR); Laurent Rocheblave, Villeurbanne (FR); Stephane Ginja, Amberieu en Bugey (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 11/976,686

(22) Filed: Oct. 26, 2007

(65) Prior Publication Data
US 2008/0122257 A1 May 29, 2008

(30) Foreign Application Priority Data
Oct. 27, 2006 (FR) .................................. 06 54616

(51) Int. Cl.
*B60J 5/10* (2006.01)
(52) U.S. Cl. ................................................ 296/146.6
(58) Field of Classification Search .............. 296/146.6, 296/50, 51, 56, 57.1, 187.03, 187.11, 151, 296/203.04, 146.5; 293/102, 117
See application file for complete search history.

(56) References Cited
U.S. PATENT DOCUMENTS

| | | | | |
|---|---|---|---|---|
| 1,892,374 A | * | 12/1932 | Ritz Woller | 16/86 A |
| 3,851,867 A | * | 12/1974 | Fricko | 267/120 |
| 3,972,428 A | * | 8/1976 | Love et al. | 414/537 |
| 4,029,353 A | * | 6/1977 | Barenyi et al. | 296/207 |
| 4,063,330 A | * | 12/1977 | Triplette | 16/321 |
| 4,357,040 A | | 11/1982 | Tomioka et al. | |
| 4,435,921 A | * | 3/1984 | Marin | 49/395 |
| 4,721,333 A | | 1/1988 | Morio | |
| 5,449,213 A | * | 9/1995 | Kiley et al. | 296/56 |
| 5,626,384 A | * | 5/1997 | Walther | 296/155 |
| 5,791,723 A | * | 8/1998 | Bell et al. | 296/155 |
| 6,474,708 B1 | | 11/2002 | Gehringhoff et al. | |
| 6,494,520 B2 | * | 12/2002 | Brzenchek et al. | 296/57.1 |
| 2004/0084925 A1 | * | 5/2004 | Ojanen | 296/50 |
| 2008/0030047 A1 | * | 2/2008 | Munenaga et al. | 296/146.6 |
| 2008/0169677 A1 | * | 7/2008 | Hedderly | 296/187.03 |

FOREIGN PATENT DOCUMENTS

| | | |
|---|---|---|
| DE | 103 27 014 A1 | 1/2005 |
| EP | 1 036 715 A2 | 9/2000 |
| FR | 2 750 365 | 1/1998 |

* cited by examiner

*Primary Examiner*—Hilary Gutman
(74) *Attorney, Agent, or Firm*—Oliff & Berridge, PLC (57) ABSTRACT

The rear door is for fitting to a motor vehicle having a rear chassis and a rear insurance impact absorber system suitable for absorbing insurance type impacts so as to prevent plastic deformation of the rear chassis of the vehicle. The door carries the rear impact absorber system of the vehicle.

11 Claims, 7 Drawing Sheets

MOTOR VEHICLE REAR DOOR

TECHNICAL FIELD

The present invention relates to a motor vehicle rear door.

PRIOR ART

On the topic of impacts, motor vehicle manufacturers seek to comply with specifications that take three categories of impact into consideration, namely:

- high speed impacts, corresponding to an impact against the front or the rear of the vehicle against a rigid or deformable obstacle at a speed of 56 kilometers per hour (km/h) to, 64 km/h, which impacts are dealt with for the purpose of protecting occupants of the vehicle;
- "insurance" impacts at about 15 km/h against a stationary wall, such as so-called Danner impacts, or "AZT" impacts, or at about 8 km/h against a pole (IIHS standard pole impact) handled with the purpose of protecting the vehicle chassis; and
- small impacts or "parking" impacts at speeds of less than 5 km/h, handled with the purpose of protecting the bodywork parts of the vehicle.

In the present application, the term "rear chassis" of the vehicle is used to designate a rigid structure comprising:

- a survival cell that does not deform plastically in the event of a high speed impact, such that the survival cell is suitable for protecting the passengers of the motor vehicle in the event of such an impact;
- two main rear side rails designed to deform plastically in the event of a high speed impact; and
- optionally any other structural part possessing stiffness of the same order of magnitude as that of the side rails, such as, for example: a rigid rear cross-member arranged at the ends of the two rear side rails.

The term "rigid cross-member" is used to designate a rigid structure extending between two points to which it is secured.

The rear chassis can also be referred to as a "rear bottom structure" or a "rear bottom body-in-white" of the vehicle.

The term "rear insurance impact absorber system" of the vehicle is used to designate a set of rear impact absorber means suitable for absorbing impacts of the "insurance" type so as to prevent the rear chassis from deforming plastically. This absorber system is intended to deform plastically in the event of an insurance impact. It should be observed that a system is considered to be suitable for absorbing impacts of the "insurance" type when it is capable, by deforming, of absorbing at least 60% of the energy in the event of an insurance impact.

It should also be observed that the energy of an impact can be absorbed equally well in register with a side rail or between the side rails, and that this is generally achieved in two different manners, namely by compression when the absorber means bears against a rigid surface, or by bending an element of the absorber means when this flexible element bears against at least two rigid bearing points that are spaced apart. When bending occurs, the element for deforming by bending in the event of an impact absorbs only a minority fraction of the energy of the impact, generally about 20%, with the absorber means also including local absorbers arranged in register with the side rails for the purpose of absorbing a majority fraction of the energy of the impact, generally about 80%, by deforming by compression.

Under all circumstances, the absorber means are capable of consuming energy by deforming so as to reduce the quantity of residual energy that is transmitted to the chassis in the event of an impact.

In the prior art, a rear door is already known that is for fitting to a motor vehicle that includes a rear chassis and a rear insurance impact absorber system suitable for absorbing insurance type impacts in order to prevent the rear chassis of the vehicle deforming plastically.

PROBLEM POSED BY THAT PRIOR ART

Figure 1:
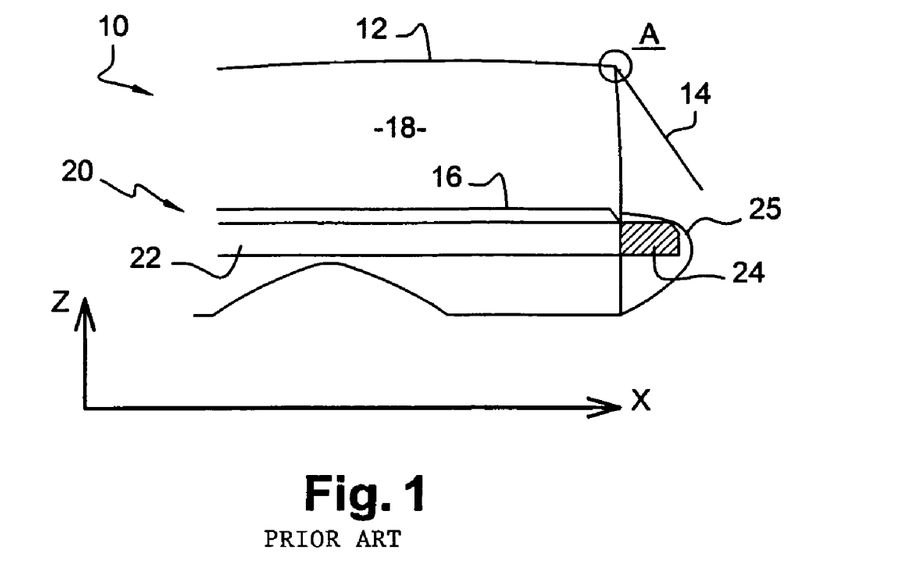
FIG. 1, described above, is a diagram showing a rear portion of a conventional motor vehicle of the type including a tailgate.

On a conventional motor vehicle, the absorber means are arranged on the side rails of the rear chassis, as shown in FIG. 1, which is a diagram showing the rear portion of a motor vehicle 10 of the type comprising a roof 12, and a door 14, known as a "tailgate", that is pivotable about a substantially horizontal pivot axis A situated in the vicinity of the roof 12.

The motor vehicle 10 also has a floor 16 co-operating with the roof 12 to define a trunk 18 of the motor vehicle 10.

The vehicle is provided with a rear chassis 20 having two main rear side rails 22 with an absorber system 24 arranged thereon, such as a transverse element or impact absorber beam that bears against each of the side rails and that works mainly in bending during an insurance impact, and that is generally associated with local absorbers arranged in register with the side rails, between the side rails and the transverse element. The vehicle also has a bumper skin 25 arranged at the same height as the side rails 22 and in register with the absorber system 24.

As can be seen in FIG. 1, the presence of the absorber system arranged at the ends of the side rails, on the inside of the bumper, leads to a considerable amount of overhang in the longitudinal direction X of the motor vehicle, thereby impeding access to the trunk 18, and in particular to the front end of the trunk when the tailgate 14 is open.

Figure 2:
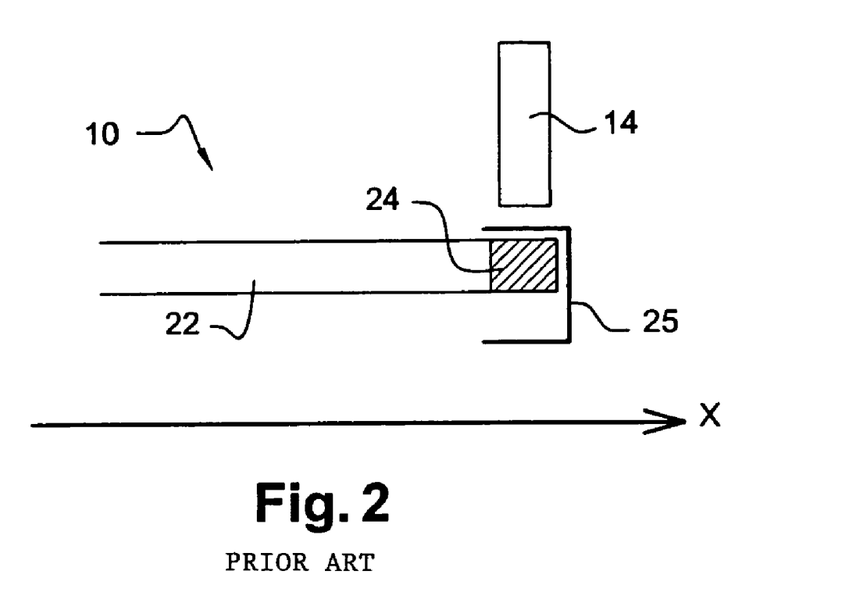
FIGS. 2 and 3, described above, are diagrams showing a rear portion of a conventional motor vehicle of the type including a tailboard, respectively when the tailboard is in the closed position and in the open position.
Figure 3:
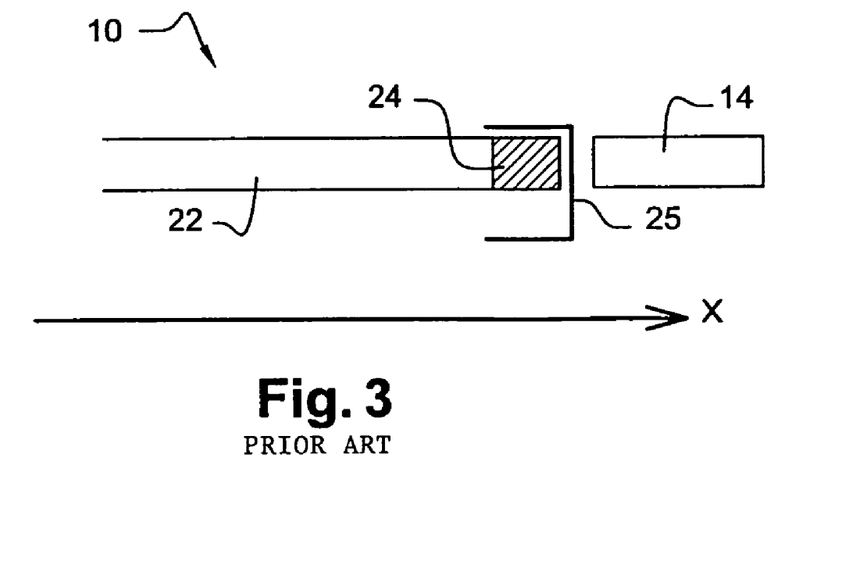

An analogous problem of trunk accessibility arises with a motor vehicle having a door 14, referred to as a "tailboard", that is pivotable about a substantially horizontal pivot axis situated in the vicinity of the floor 16 of the motor vehicle 10. One such vehicle is described for example in DE 103 27 014. FIGS. 2 and 3 are diagrams respectively of the rear of such a conventional motor vehicle, respectively when the tailboard 14 is closed and when it is open.

The motor vehicle 10 has an absorber system 24 including an impact absorber beam together with local absorbers arranged in register with the side rails 22, between the side rails 22 and the absorber beam. The vehicle also has a bumper skin 25 arranged at the same height as the side rails 22, in register with the absorber system 24. This bumper skin 25 has a decorative function and does not contribute significantly to absorbing an impact.

Since such a bumper skin 25 is relatively bulky, the tailboard 14 must go beyond it on opening, as shown in FIG. 2, thereby giving rise to a considerable amount of overhang in the same longitudinal direction X, impeding access to the motor vehicle trunk, and in particular to the front end of the trunk when the tailboard 14 is open.

An object of the invention is to reduce the overhang of the vehicle in the longitudinal direction X, thereby facilitating access to the trunk, in particular to its front end, and to do without reducing the effectiveness of the absorber system, which is necessary for protecting the chassis in the event of an impact of the insurance impact type.

TECHNICAL SOLUTION PROPOSED BY THE INVENTION

The invention provides a rear door for fitting to a motor vehicle having a rear chassis and a rear insurance impact absorber system suitable for absorbing insurance type impacts so as to prevent the rear chassis of the vehicle from deforming plastically, the door being characterized in that it carries the rear impact absorber system of the vehicle.

ADVANTAGES PROVIDED BY THE INVENTION

In the invention, the absorber system is no longer carried by the rear chassis, thus making it possible to reduce the overhang in the longitudinal direction of the vehicle when the door is open. This reduction in overhang corresponds overall to the width of the absorber system, plus the space occupied by the bumper skin in the longitudinal direction.

In addition, when the rear chassis does not have a rigid cross-member between the two side rails, the invention is particularly advantageous since it makes it possible to increase the height of the rear end of the trunk by lowering its loading height.

Indeed in the prior art, because of the presence of a generally transverse absorber system arranged at the ends of the side rails, the rear end of the trunk that is situated between the side rails is blocked off by the absorber system. Thus, the height of this rear end cannot be lower than the height of the side rails. This disposition is therefore awkward for loading articles that are heavy and bulky into the vehicle.

By means of the invention, the absorber system no longer blocks off the rear end of the trunk since it is carried by the door, such that the space situated between the two side rails is unencumbered. The rear end of the trunk, situated between the two side rails can then be lower, thereby making the trunk more accessible.

In addition, since the absorber system is carried by the door, the skin of the door can perform the appearance function that is normally performed by the bumper skin. Unlike a conventional bumper skin, this skin of the door does not run any risk of needing to support heavy articles being loaded into the trunk since the door is then open. Since the bumper skin of a conventional vehicle is relatively fragile (can be damaged by bangs and scratches), it is preferable for it not to carry heavy articles being loaded into the trunk, since they would be likely to bring their weight to bear on the skin and thus give rise to deformation.

ADVANTAGEOUS PARTICULAR EMBODIMENTS

The invention may also include one or more of the following characteristics:

Since the rear door is for fitting to a motor vehicle with a rear chassis that includes side rails, the absorber system is arranged on the door in such a manner as to be located at the same height as at least a portion of each side rail when the motor vehicle is fitted with the door, and when said door is closed, such that the absorber system is suitable for transmitting forces to the side rails in the event of an impact against the absorber system. Thus, a path is created for transmitting force between the absorber system and the side rails that enables the residual energy of an impact to be transmitted to the side rails of the vehicle, in particular in the event of a high speed impact.

Since the rear door is for fitting a motor vehicle with a rear chassis including two rear side rails, the absorber system comprises a transverse element extending transversely over a distance greater than or equal to the distance between the two side rails. Thus, in the event of an impact, all of the force received on a portion of this transverse element can be transmitted to the vehicle chassis, regardless of the portion of the transverse element that is subjected to the impact.

Since the rear door is for fitting to a motor vehicle with a rear chassis including a transverse rigid cross-member, the transverse element is shaped to deform by compression against the rigid cross-member of the rear chassis of the vehicle in the event of an insurance impact. Thus, it is by flattening the transverse element against the rigid cross-member that the transverse element absorbs the energy of an insurance impact.

Since the rear door is for fitting to a motor vehicle with a rear chassis including two rear side rails, the absorber system includes two lateral absorber elements, each located in register with one of the side rails between the transverse element and one of the side rails, the transverse element being shaped to deform by bending between the two rear side rails of the vehicle in the event of an insurance impact. Under such circumstances, the transverse element absorbs only a minority fraction of the energy of the impact, generally about 20%, and the lateral absorber element absorbs a majority fraction of the energy of the impact, generally about 80%, by deforming by compression. Thus, when the rear chassis does not have a rigid cross-member, the space situated between the two side rails is unencumbered so as to enable the transverse element to deform by bending, thereby absorbing the energy of an insurance impact. Under such circumstances, it is particularly advantageous for the transverse element to be curved towards the outside of the vehicle so as to deform additionally by losing its curvature, thereby absorbing the energy of an impact more effectively. In order to enhance force transmission, the lateral elements are provided with centering fingers for co-operating with complementary orifices formed in the side rails so as to prevent the transverse element turning while it is deforming by bending.

The rear door includes an outside skin and an inside skin together defining a housing for at least a portion of the absorber system. Thus, advantage is taken of the space defined by the two skins for receiving all or part of the absorber system, so that the system is not visible from outside the vehicle and therefore does not lead to constraints on appearance. It should be observed that the term "outside skin" is used to mean a skin for which a large portion of its area is visible from outside the vehicle when the door is closed, and which may also include elements fitted thereto covering part of said outside surface, such as a capping strip for decorating or protecting the skin in the event of a parking impact.

The rear door includes an outside skin and an inside skin, the absorber system being housed in a box-forming bodywork part fitted onto the outside skin on its side remote from the inside skin. Under such circumstances, in the event of an insurance impact in which only the absorber system and the box are deformed, it is possible that only the absorber system and the box need to be replaced and not any other elements of the door. Advantageously, the outside skin forms a setback in which the box is received, the box and said outside skin thus presenting complementary shapes so as to avoid adding a shape that projects from the outside skin as a whole.

The rear door is pivotable about a substantially horizontal pivot axis situated in the vicinity of the roof of the motor vehicle when the motor vehicle is fitted with the door. For example the door is a tailgate. This embodiment is particularly advantageous for reducing the length of the rear of the vehicle in the longitudinal direction when the door is open.

The rear door is pivotable about a pivot axis that is substantially horizontal and situated beneath the level of the side rails of the motor vehicle, when the motor vehicle is fitted with the door. For example the door is a tailboard. This embodiment is advantageous for providing easier access to the front end of the trunk in a vehicle having a tailboard. Since the door carries the absorber system, it can also include the rear bumper skin. Thus, once the door is in the open position, the bumper skin, which may be constituted by the skin of the tailboard, faces towards the ground and is therefore no longer interposed between the bottom of the trunk and the door in the longitudinal direction of the vehicle. As a result the front of the trunk is more accessible than in the prior art.

The invention also provides a motor vehicle having a rear chassis, the motor vehicle being characterized in that it includes a rear door as defined above.

BRIEF DESCRIPTION OF THE FIGURES

The invention can be better understood on reading the following description given with purely by way of example and made with reference to the drawings, in which.

DESCRIPTION OF AN EXAMPLE

In all of the figures, elements that are analogous are designated by references that are identical.

Figure 4:
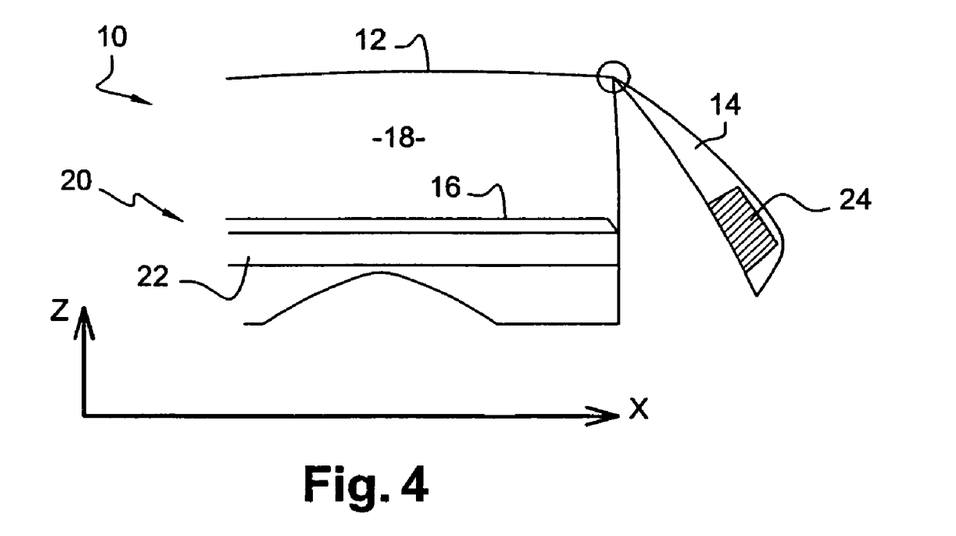
FIG. 4 is a view analogous to FIG. 1 showing the rear portion of a motor vehicle constituting a first embodiment of the invention.

FIG. 4 shows the rear portion of a motor vehicle 10 constituting a first embodiment of the invention. The motor vehicle comprises a roof 12 and a floor 16 co-operating with the roof 12 to define a trunk 18. The motor vehicle has a door 14 that is pivotable about a pivot axis A that is substantially horizontal and that is situated in the vicinity of the roof 12 of the motor vehicle 10. Such a door 14 is usually called a tailgate.

The motor vehicle also has a rear chassis 20, including rear side rails 22.

The door 14 carries an absorber system 24 suitable for absorbing insurance type impacts so as to prevent the rear chassis 20 of the vehicle suffering plastic deformation in the event of an insurance impact.

The absorber system 24 is preferably carried by the door 14 so as to be localized at the same height as at least a portion of each of the side rails 22 when said door 14 is closed, such that the absorber system 24 is suitable for transmitting forces to the side rails 22 in the event of an impact against the absorber system 24.

It should be observed that since the absorber system 24 is carried by the door 14, it is not arranged on the side rails 22, thus making it possible to reduce the overhang along a longitudinal direction X of the motor vehicle in comparison with a conventional vehicle, as can be seen by comparing FIGS. 1 and 4.

Figure 5:
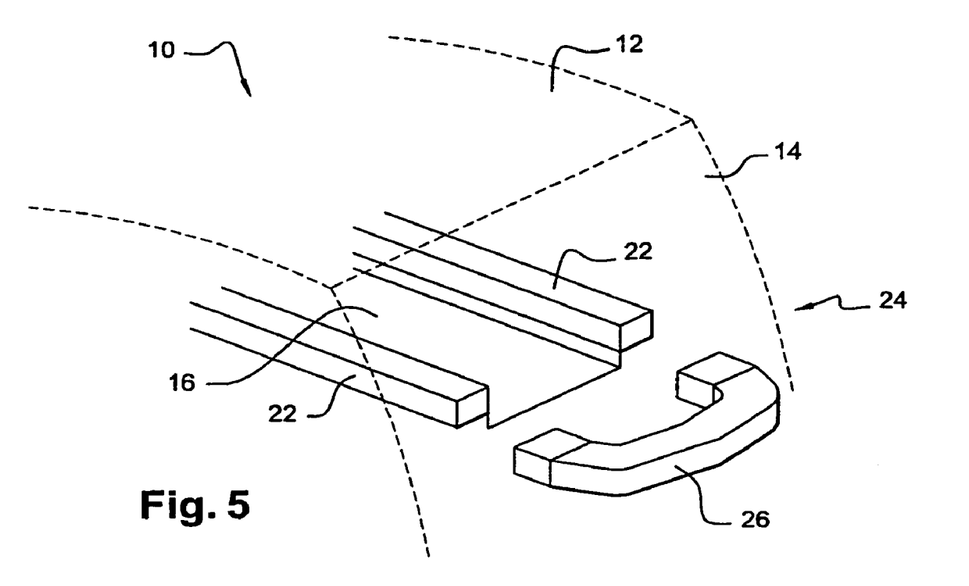
FIG. 5 is a perspective view of the rear portion of the FIG. 4 motor vehicle.
Figure 6:
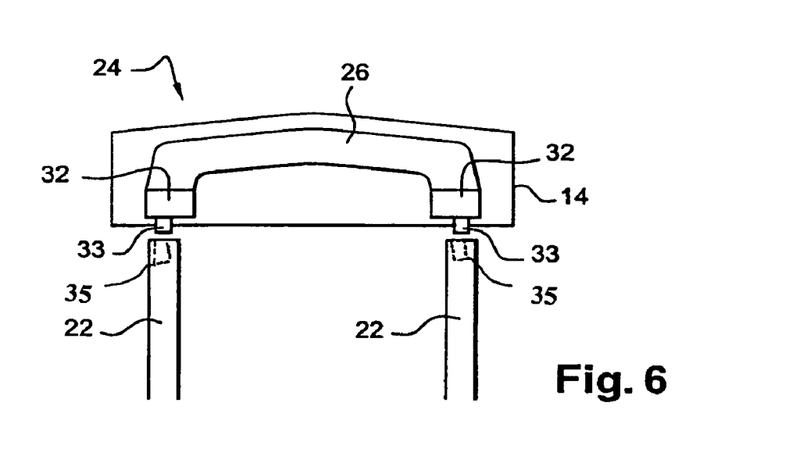
FIG. 6 is a plan view of the rear portion of the FIG. 5 motor vehicle.

In the first embodiment of the invention, the absorber system 24 comprises a transverse element 26 extending transversely over a distance that is greater than or equal to the distance between the two side rails 22, as can be seen in FIGS. 5 and 6. In this first embodiment, the transverse element 26 is shaped to deform in bending between the two rear side rails 22 of the vehicle 10 in the event of an insurance impact, thereby absorbing the energy of the impact. The transverse element 26 preferably curves towards the outside of the vehicle, thus enabling it to deform more by losing its curvature, thereby absorbing the energy of an impact more effectively.

In this embodiment, the absorber system 24 further includes two lateral absorber elements 32, each located in register with a side rail 22, and shaped to deform in compression against the side rail, these lateral absorber elements 32 being associated with the transverse element 26 which is arranged behind them so as to bear against them in the event of an impact.

In the event of an impact, the transverse element 26 absorbs only a minority fraction of the energy of the absorber, generally about 20%, while the lateral elements 32 absorb a majority fraction, of the energy of the impact, generally about 80%.

As can be seen in FIG. 6, the lateral elements are provided with centering fingers 33 designed to co-operate with complementary orifices 35 formed in the side rails 22 so as to prevent the transverse elements 26 turning when it is deforming in bending.

Under such circumstances, it should be observed that the space between the two side rails 22 is empty, so it is possible to arrange the floor 16 under the side rails so as to increase the volume of the trunk 18. Indeed, by means of the invention, the absorber system 24 does not occupy the rear end of the trunk 18 since it is carried by the door 14, such that the space situated between the two side rails 22 is unencumbered. The rear end of the trunk 18 situated between the two side rails 22 can thus be lower, and therefore more practical.

Figure 7:
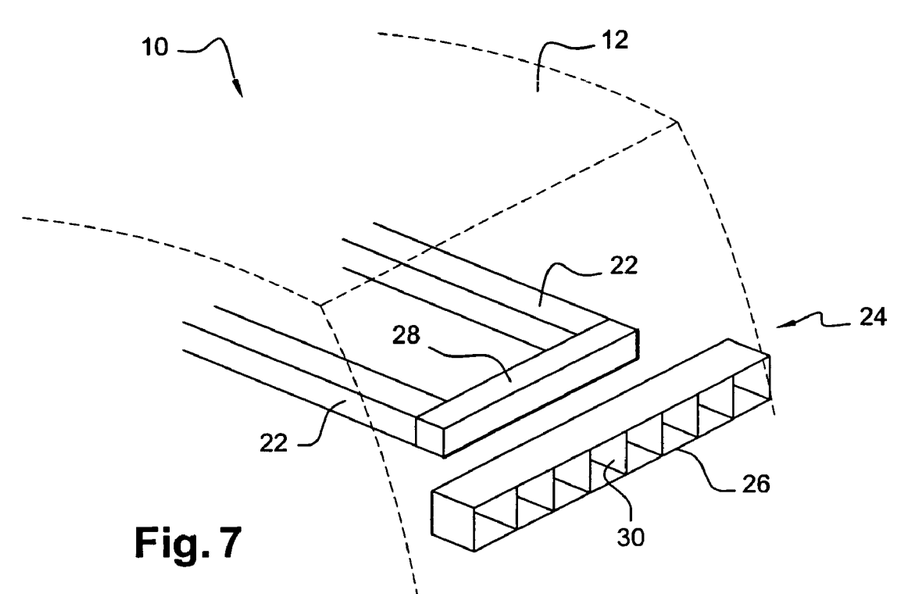
FIG. 7 is a view analogous to FIG. 5 showing the rear portion of a motor vehicle constituting a first variant of the first embodiment of the invention.

In a first variant shown in FIG. 7, the rear chassis 20 comprises a rigid transverse cross-member 28 welded to the ends of the side rails 22, extending transversely relative to the side rails 22. In this variant, the transverse element 26 is shaped to deform by compression against the rigid cross-member 28 of the rear chassis 20 of the vehicle 10 in the event of an insurance impact. For this purpose, the transverse element 26 is preferably provided with ribs 30, e.g. arranged in a honeycomb, these ribs serving to absorb energy by compression in known manner.

Figure 8:
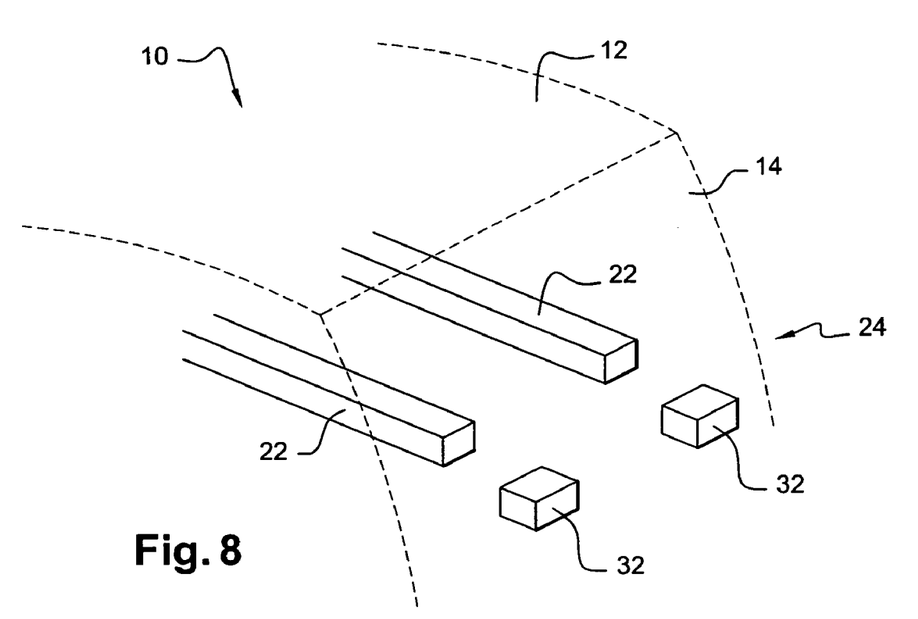
FIG. 8 is a view analogous to FIG. 5 showing the rear portion of a motor vehicle constituting a second variant of the first embodiment of the invention.

In a second variant shown in FIG. 8, the absorber system 24 has two lateral absorber elements 32, each located in register with a respective side rail 22, and shaped to deform by compression against the corresponding side rail 22.

Figure 9:
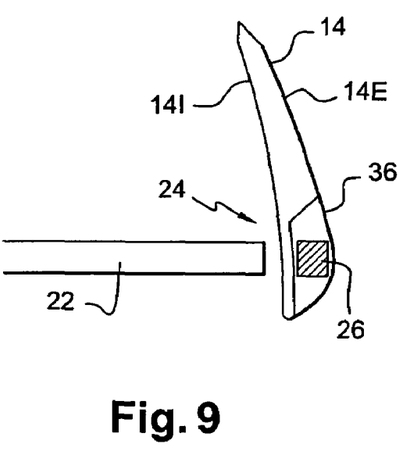
FIG. 9 shows a detail of the rear portion of the FIG. 4 motor vehicle.

FIG. 9 shows a detail in longitudinal section of the rear portion of the motor vehicle 10.

As can be seen in FIG. 9, the door 14 comprises an outside skin 14E and an inside skin 14I, the absorber system 24 being housed in a box-forming bodywork part 36 fitted on the outside of the outside skin 14E, i.e. remote from the inside skin 14I. The box 36 is preferably fitted in a setback in the outside skin 14E, so that the box 36 and the outside skin 14E present shapes that are complementary, without adding any shape that projects beyond the outside skin as a whole.

Figure 10:
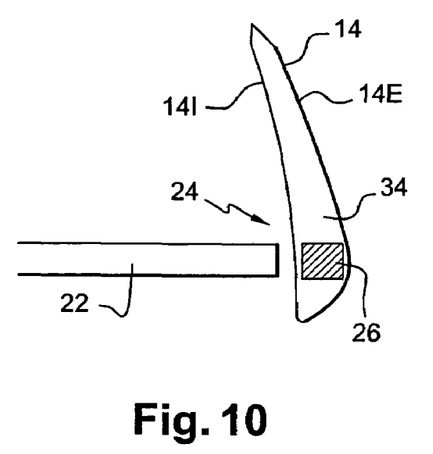
FIG. 10 is a view similar to FIG. 9 showing the rear portion of a motor vehicle constituting another variant.

In a variant shown in FIG. 10, the outside skin 14E and the inside skin 14I together define a housing 34 in which at least a portion of the absorber system 24 is housed, e.g. the transverse element 26.

It should be observed that the door 14 may also carry a capping strip fitted onto the outside skin 14E and suitable for absorbing parking type impacts, and possibly also performing a decorative function. Nevertheless, these decorative and absorption functions are preferably performed by the skin of the door 14.

Figure 11:
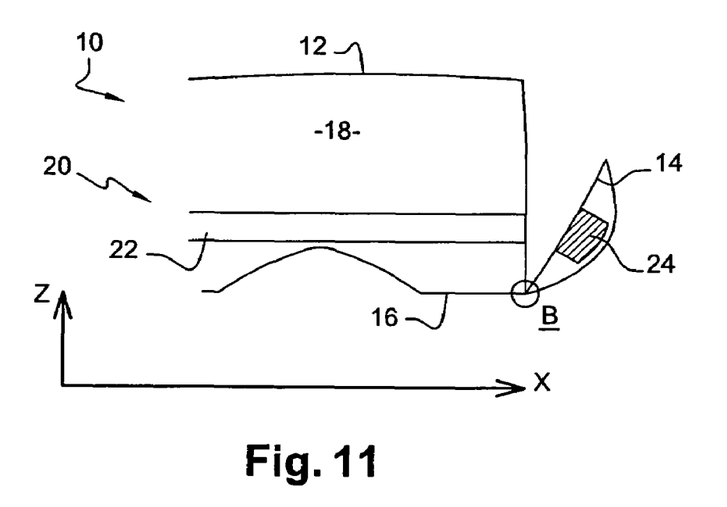
FIG. 11 is a view similar to FIG. 4 showing the rear portion of a motor vehicle constituting a second embodiment of the invention.
Figure 12:
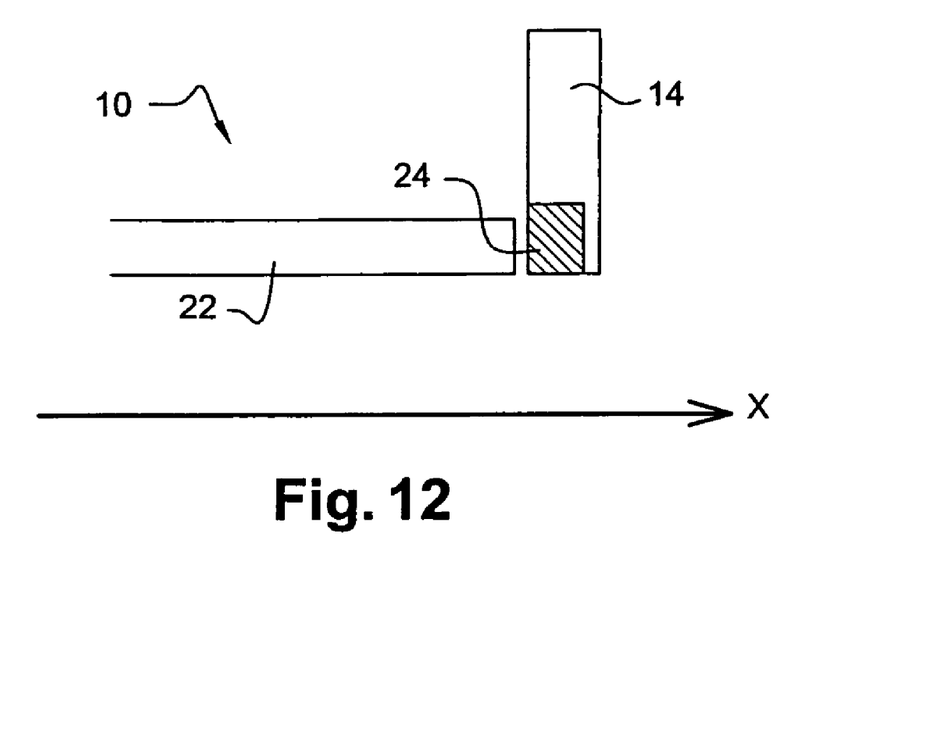
FIGS. 12 and 13 are views analogous to FIGS. 2 to 3 showing the rear portion of the motor vehicle constituting the second embodiment of the invention, respectively when the tailboard is in the closed position and in the open position.
Figure 13:
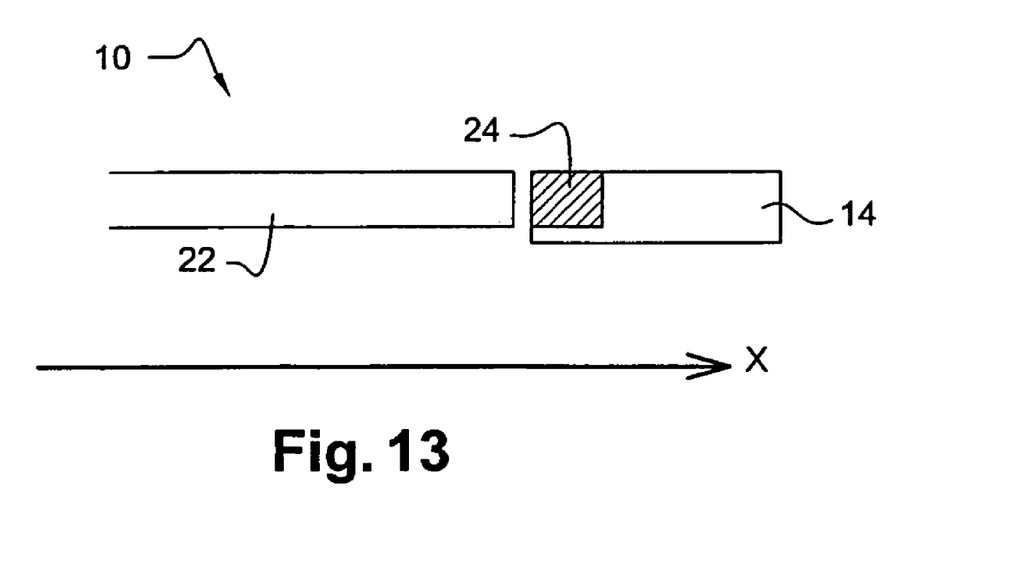

FIGS. 11 to 13 show the rear portion of a motor vehicle 10 in a second embodiment of the invention.

In this embodiment of the invention, the rear door 14 is pivotable about a pivot axis B that is substantially horizontal and situated between the side rails of the motor vehicle 10. Such a door 14 is generally referred to as a tailboard.

As can be seen in FIGS. 12 and 13, the tailboard 14 includes the bumper skin. Unlike the prior art, this bumper skin is thus not interposed between the tailboard 14 and the side rails 22 when the tailboard 14 is in the open position. This reduces the overhang of the motor vehicle in the longitudinal direction X.

Figure 14:
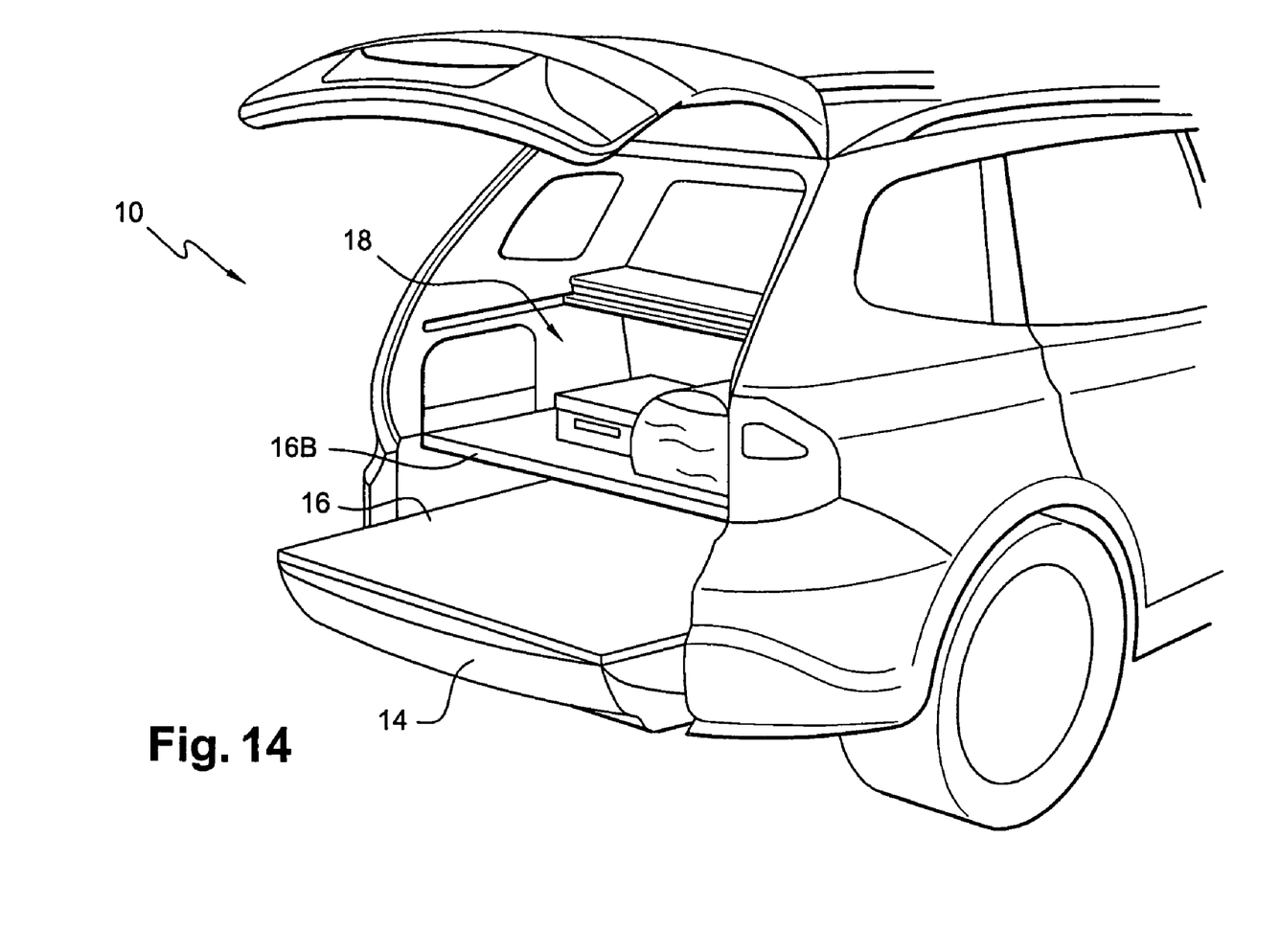
FIG. 14 is a perspective view of a motor vehicle constituting a third embodiment of the invention.

FIG. 14 shows a motor vehicle 10 constituting a third embodiment of the invention.

In this third embodiment, the door 14 (in this case a tailboard) comprises a transverse element extending transversely over a distance that is greater than or equal to the distance between the two side rails 22, in the same manner as in the first embodiment described with reference to FIGS. 5 and 6.

Thus, as described in detail above, the floor 16 can be disposed below the side rails, so as to increase the volume of the trunk 18. This characteristic can be optimized by equipping the vehicle 10 with an intermediate floor 16B subdividing the trunk 18 into two compartments, as can be seen in FIG. 14.

In order to facilitate access to the bottom portion of the trunk 18, the bottom floor 16 may be slidable, e.g. on slide means associated with the tailboard 14 and suitable for sliding when opening the tailboard 14.

It should be observed that this third embodiment can also be implemented on a vehicle in which the door 14 is a tailgate, so long as the door includes an absorber system making it possible to arrange the floor 16 below the side rails.

Finally, it should be observed that the invention is not limited to the embodiments described above, but covers any variant that does not go beyond the ambit of the claims.

In particular, it is possible to combine various characteristics of the different variants and embodiments without going beyond the ambit of the invention.

The invention claimed is:

1. A rear door for fitting to a motor vehicle having a rear chassis with two rear side rails and a rear insurance impact absorber system configured to prevent the rear chassis of the vehicle from deforming plastically when the rear insurance impact absorber system absorbs an insurance impact, the insurance impact being an impact of up to about 15 km/h against a stationary wall or an impact of up to about 8 km/h against a pole, wherein the rear door carries the rear insurance impact absorber system, and the absorber system comprises:

a transverse element extending transversely over a distance greater than or equal to the distance between the two side rails, the transverse element being shaped to deform by bending between the two rear side rails of the vehicle in the event of an insurance impact; and two lateral absorber elements, each lateral absorber element being located in register with one of the side rails between the transverse element and one of the side rails, and each lateral absorber element being provided with a centering finger designed to co-operate with a complementary orifice formed in the corresponding side rail.

2. A rear door according to claim 1, pivotable about a substantially horizontal pivot axis situated in the vicinity of a roof of the motor vehicle when the motor vehicle is fitted with the door.

3. A rear door according to claim 1, wherein the rear door is pivotable about a pivot axis that is substantially horizontal and situated beneath the level of the side rails of the motor vehicle, when the motor vehicle is fitted with the door.

4. A rear door according to claim 1, wherein the rear door has an outside skin and an inside skin together defining a housing, the absorber system being housed in a box-forming bodywork part fitted onto the outside skin, outside the housing.

5. A rear door according to claim 1, wherein the rear door has an outside skin and an inside skin together defining a housing for at least a portion of the absorber system.

6. A rear door according to claim 1, wherein each centering finger is designed to co-operate with the complementary orifice formed in the corresponding side rail when the door is in a closed position relative to the motor vehicle.

7. A motor vehicle including a rear chassis with two rear side rails and a rear door, wherein the rear door carries a rear insurance impact absorber system configured to prevent the rear chassis of the vehicle from deforming plastically when the rear insurance impact absorber system absorbs an insurance impact, the insurance impact being an impact of up to about 15 km/h against a stationary wall or an impact of up to about 8 km/h against a pole, and wherein the rear insurance impact absorber system comprises:

a transverse element extending transversely over a distance greater than or equal to the distance between the two side rails, the transverse element being shaped to deform by bending between the two rear side rails of the vehicle in the event of an insurance impact; and two lateral absorber elements, each lateral absorber element being located in register with one of the side rails between the transverse element and one of the side rails, and each lateral absorber element being provided with a centering finger designed to co-operate with a complementary orifice formed in the corresponding side rail.

8. A motor vehicle according to claim 7, wherein the absorber system is arranged on the door at the same height as at least a portion of each side rail when said door is closed, such that the absorber system is configured to transmit forces to the side rails in the event of an impact against the absorber system.

9. A motor vehicle according to claim 7, wherein the rear chassis includes a transverse rigid cross-member, in which the transverse element is shaped to deform by compression against the rigid cross-member of the rear chassis of the vehicle in the event of the insurance impact.

10. A motor vehicle according to claim 7, wherein the rear door has an outside skin and an inside skin together defining a housing for at least a portion of the absorber system.

11. A motor vehicle according to claim 7, wherein each centering finger is designed to co-operate with the complementary orifice formed in the corresponding side rail when the door is in its closed position.

* * * * *